United States Patent [19]

Nishimura et al.

[11] Patent Number: 5,734,414
[45] Date of Patent: Mar. 31, 1998

[54] CAMERA APPARATUS FOR ELECTRONIC CONFERENCE

[75] Inventors: Hiroyuki Nishimura, Kasuga; Yasuaki Muranaka, Fukuoka-ken; Hiroyuki Tashiro, Dazaifu; Takashi Yamaguchi, Fukuoka, all of Japan

[73] Assignee: Matsushita Electric Industrial Co., Ltd., Osaka, Japan

[21] Appl. No.: 395,097

[22] Filed: Feb. 27, 1995

[30] Foreign Application Priority Data

Mar. 3, 1994 [JP] Japan .................................. 6-033411

[51] Int. Cl.⁶ .................................................. H04N 7/14
[52] U.S. Cl. .................................. 348/14; 348/373
[58] Field of Search ............................ 348/14, 15, 20, 348/373, 374, 375; H04N 7/14, 7/15

[56] References Cited

U.S. PATENT DOCUMENTS

| | | |
|---|---|---|
| 5,164,827 | 11/1992 | Paff . |
| 5,253,286 | 10/1993 | Sano et al. . |
| 5,318,257 | 6/1994 | Tani .................... 348/14 |
| 5,400,068 | 3/1995 | Ishida et al. ............ 348/14 |
| 5,479,203 | 12/1995 | Kawai et al. ............ 348/15 |

FOREIGN PATENT DOCUMENTS

| | | |
|---|---|---|
| 0539695A2 | 5/1993 | European Pat. Off. . |
| 51-67899A | 7/1993 | Japan . |
| 406133307 A | 5/1994 | Japan . |
| 63-34906A | 12/1994 | Japan . |

Primary Examiner—Stella Woo
Attorney, Agent, or Firm—Watson Cole Stevens Davis, P.L.L.C.

[57] ABSTRACT

A camera unit for an electronic conference is adapted to be set on a monitor, and comprises a stationary support base set on the monitor, a camera unit body provided on said stationary support base so as to be horizontally rotatable, a lens block supported to the camera unit body so as to be vertically rotatable, and a control device incorporated in the camera unit body, for controlling the rotation of the camera unit body and the lens block and the focal distance and zooming ratio of the lens block, the lens block is adapted to be turned between a horizontal position at which the lens block is stored in a recess formed in the camera unit body, and picks up a person in front thereof, and a vertical position at which the lens block is projected forward from the camera unit body so as to pick up a document set therebelow, and the control device controls the focal distance and zooming ratio of the lens block in accordance with a horizontally rotating position of the camera unit body and a vertical rotating position of the lens block.

14 Claims, 11 Drawing Sheets

CAMERA APPARATUS FOR ELECTRONIC CONFERENCE

BACKGROUND OF THE INVENTION

1. Field of the Invention

The present invention relates to a camera apparatus which can be used pick-up mode a person and a document pick-up mode.

2. Description of the Related Art

In recent years, with the progress of process technology for image data and data communication technology, video telephone communication systems and electronic conference systems for intercommunicating video data have been practically used. Explanation will be hereinbelow made of such conventional camera apparatuses adapted to be used for the electronic conference systems.

Figure 8:
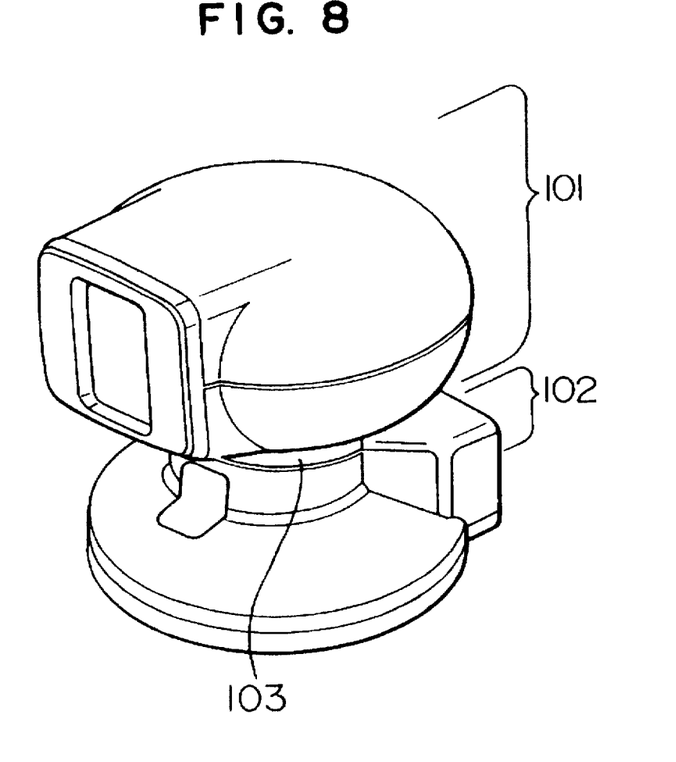
FIG. 8 is a perspective view illustrating a camera unit for an electronic conference as a first conventional example.

Japanese Laid-Open Patent No. 6-334906 (Japanese Patent Application No. 5-121283 filed by the same assignee), as a first conventional example, proposed a structure of a compact camera apparatus. Referring to FIG. 8 which is a perspective view illustrating this camera apparatus comprising a movable housing 101, a stationary housing 102 and a spacer 103, the movable housing 101 being rotatably coupled to the stationary housing 103 through the intermediary of the spacer 103. The movable housing 101 incorporates a camera part (which is not shown) including an image pick-up element and an image processing circuit, and a tilt drive part (which is not shown) for moving the camera part in a vertical plane.

The stationary housing 102 incorporates a pan drive part for horizontally moving the movable housing 101, and a control part for controlling the camera apparatus in its entirety.

The thus arranged camera apparatus in the first conventional example, can be suitably used for picking up a person or a meeting room when it is used for an electronic conference. However, since its structure limits the range of the tilt operation of the camera part, it can not pick up a document sheet set on a table. Thus, a document pick-up camera is additionally required.

Figure 9A:
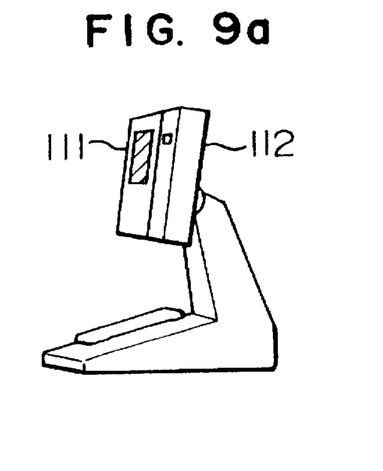
FIG. 9a is a perspective view illustrating a camera unit for an electronic conference as a second conventional example in a person pick-up mode.
Figure 9B:
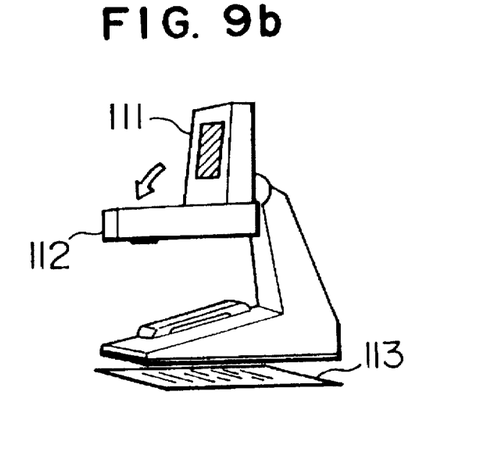
FIG. 9b is a perspective view illustrating the camera unit shown in FIG. 9a in a document pick-up mode.

Further, as a second conventional example, Japanese Laid-Open Patent No. 5-167899 proposed a structure of a camera apparatus adapted to be used for picking up a person and a document sheet. FIGS. 9a to 9b are perspective views illustrating this conventional camera apparatus having a monitor part 111 and a camera part 112, FIG. 9a showing the camera apparatus which has been set for picking up a person while FIG. 9b shows the camera apparatus which has been set for picking up a document sheet 113. The monitor part 111 has a stationary housing incorporating a display device such as a LCD or a CRT. The camera part 112 is a housing incorporating a camera (which is not shown) including an image pick-up element and an image processing circuit, and journalled by the monitor part 111 so as to be rotatable in a vertical plane.

The camera apparatus in this second conventional example, is advantageous in that a person and a document can be picked up by a single camera. However, the horizontal pick-up range is limited to a pick-up viewing angle inherent to the lens of the camera, and accordingly, the camera is not suitably used for a large conference room.

Figure 10:
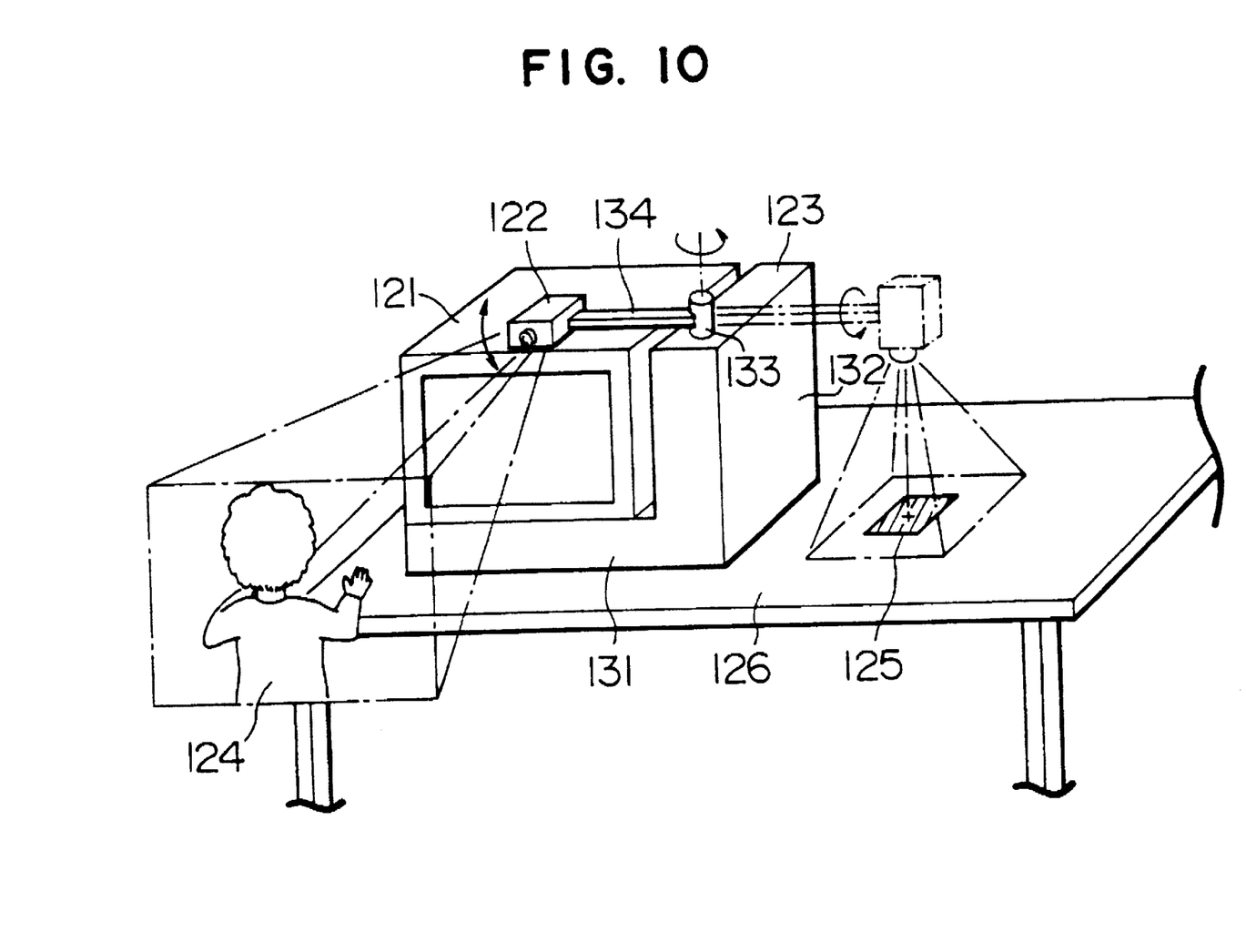
FIG. 10 is a perspective view illustrating a camera unit in a third conventional example.

In order to overcome the above-mentioned problems, a camera apparatus which can perform horizontal and vertical motion in a wide range was proposed. Referring to FIG. 10 which is a perspective view for illustrating an exterior of a conventional camera unit for an electronic conference, a stationary base 123 having an L-like cross-sectional shape and composed of a bottom part 131 and a side part 132 is set on a monitor setting table 126. A monitor 121 is set on the bottom part 131 of the stationary base 123. Further, the camera unit 122 is arranged on the top of the monitor 121, by means of a horizontally rotary shaft 133 and the rotary arm 134.

The horizontally rotary shaft 133 is vertically journalled to the top surface of the side part 132 of the stationary base 123. The rotary arm 133 is integrally incorporated with the horizontally rotary shaft 133, perpendicularly thereto, and is attached at its one end with the camera unit 122. Accordingly, the camera unit 122 and the rotary arm 134 can be rotated in a horizontal plane in association with the rotation of the horizontal rotary shaft 133. The camera unit 122 is attached to the front end of the rotary arm 134 so as to be vertically rotatable in a plane perpendicular to the rotary arm 134.

With the thus constructed camera apparatus, a personal subject 124 is located in front of the monitor 121, and a document subject 125 such as a document or a photograph adapted to be used in a conference or the like is set on one lateral side of the stationary base 123 on the monitor setting table 126 in a normal use mode. The camera unit 122 picks up the personal subject 124 in front of the monitor 121.

In the case of picking up a document subject 134 by the camera unit 122, the camera unit 122 is manually turned by an angle of 180 deg. around the horizontal rotary shaft 133, and thereafter, the camera unit 122 is manually turned downward by an angle of 90 deg. around the rotary arm 134.

Thus, such a conventional camera unit for an electronic conference can be manually changed over between the person pick-up mode and the document pick-up mode.

However, in use of the camera unit arranged as mentioned above for an electronic conference, it takes a long time for the change-over between the person pick-up mode and the document pick-up mode. Further, since the document subject 125 is positioned far from the user (personal subject 124), it has been disadvantageous in that the user encounters a difficulty in handling the document subject 125.

Further, the system requires use a special stationary base 123 having the horizontal rotary shaft 133 and the rotary arm 134.

SUMMARY OF THE INVENTION

One object of the present invention is to provide a camera unit for an electronic conference, which can be changed over at once between a person pick-up mode and a document pick-up mode with a simple construction, and is excellent in manipulatability and low in cost.

According to the present invention, a camera unit for an electronic conference is composed of three components, that is, a lens block, a camera unit body and a stationary support base.

The lens block has a tilt rotary shaft which is journalled so as to be vertically rotatable, at its frontmost and lowest part of the lens block, and incorporates therein a lens mechanism for picking up a subject.

The camera unit body is composed of first support means for supporting the lens block which is therefore rotatable in a vertical plane, first drive means for rotating the lens block and means for processing an image signal obtained from the lens block, and defining therein a recessed space for receiving the lens block.

The stationary support base incorporates therein second support means for supporting the camera unit body which is therefore rotatable in a horizontal plane, second drive means for rotating the camera unit body, and control means for controlling the first drive means, the second drive means and the camera unit in its entirety.

Further, the control means includes memory means for previously storing therein focal distances and zooming ratios for the lens mechanism in accordance with turning operation of the lens block and the camera unit body.

With this arrangement, in the camera unit for an electronic conference, according to the present invention, no mechanical limitation is imparted to either of the turning operation of the camera unit body in a horizontal plane and the vertical motion of the lens block. Moreover, the position of the tilt rotary shaft of the lens block is set in the frontmost and lowest part thereof, the lens block is projected from the front part of the camera unit body when the lens block is turned so as to pick up a document pick-up position. Accordingly, the lens mechanism can pick up a document subject while its field of view is prevented from being hindered by an obstacle.

Further, when the lens block is turned so as to pick up a personal subject, the lens block is stored in the recessed space in the camera unit body so as to obtain a compact external shape.

Futhermore, the document subject which is set on the monitor setting table in front of the monitor, can be picked up with a suitable focal distance and a zoom ratio (viewing angle) which have been previously set, only by simply turning the lens mechanism by an angle of about 90 deg. with the use of a remote control unit. Accordingly, it is possible to use the camera unit for an electronic conference so as to change over the same between the person pick-up mode and the document pick-up mode.

Further, since signal cables and the like which are connected to external units, are all connected to the rear surface of a rear part of the stationary support base, they can be maintained to be stationary without being displaced, in association with a pan or tilt motion of the camera unit for an electronic conference, and further, there is no such a risk that the signal cables and the like hinder the field of view in front of the monitor and the lens mechanism.

BRIEF DESCRIPTION OF THE DRAWINGS

FIGS. 3b to 3d are enlarged front views illustrating parts shown in FIG. 3a;

FIG. 4a is a perspective illustrating a lens block holding member which is variant from that shown in FIG. 3a;

FIG. 4b is a perspective view illustrating a lens block holding member which is further variant from that shown in FIG. 3a;

DESCRIPTION OF THE PREFERRED EMBODIMENTS

Figure 1:
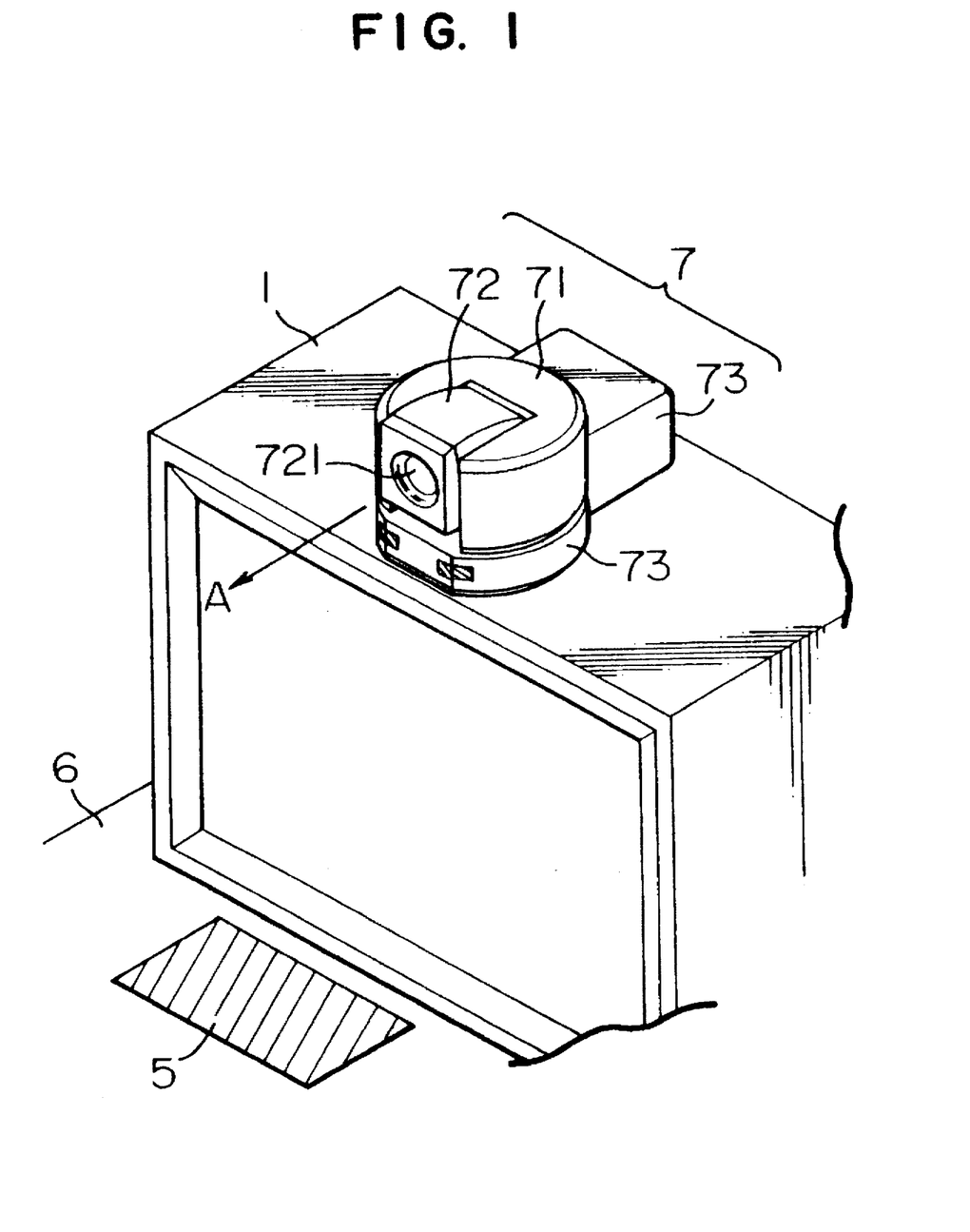
FIG. 1 is a perspective view illustrating a camera unit for an electronic conference in one embodiment of the present invention.

Explanation will be hereinbelow made of an embodiment of the present invention with reference to the drawings. Referring to FIG. 1, a camera unit 7 is composed of three main components, that is, a cylindrical camera unit body 71, a rectangular parallelepiped lens block 72 and a stationary support base 73. It is self-explanatory in view of its use that the forward direction is defined by the arrow A shown in FIG. 1, and accordingly, the definition is effective throughout the explanation.

The lens block 72 incorporates a lens mechanism 721, and is journalled in the camera unit body 71 so as to be vertically rotatable (in a tilt direction). Further, the stationary support base 73 supports the camera unit body 71 which is therefore rotatable right and left (in a pan direction) in a horizontal plane.

This stationary support base 73 is fixed to the top of the monitor 1 which is set on a monitor setting table 6, and a document subject 5 such as a document or a photograph is set on the monitor setting table 6 in front of the monitor 1.

During use of the camera unit for an electronic conference, FIG. 1 shows a person pick-up mode in which the lens block 72 is directed forward (in the direction of the arrow A) so that the camera unit body 71 picks up a personal subject positioned in front of the monitor 1.

Figure 2:
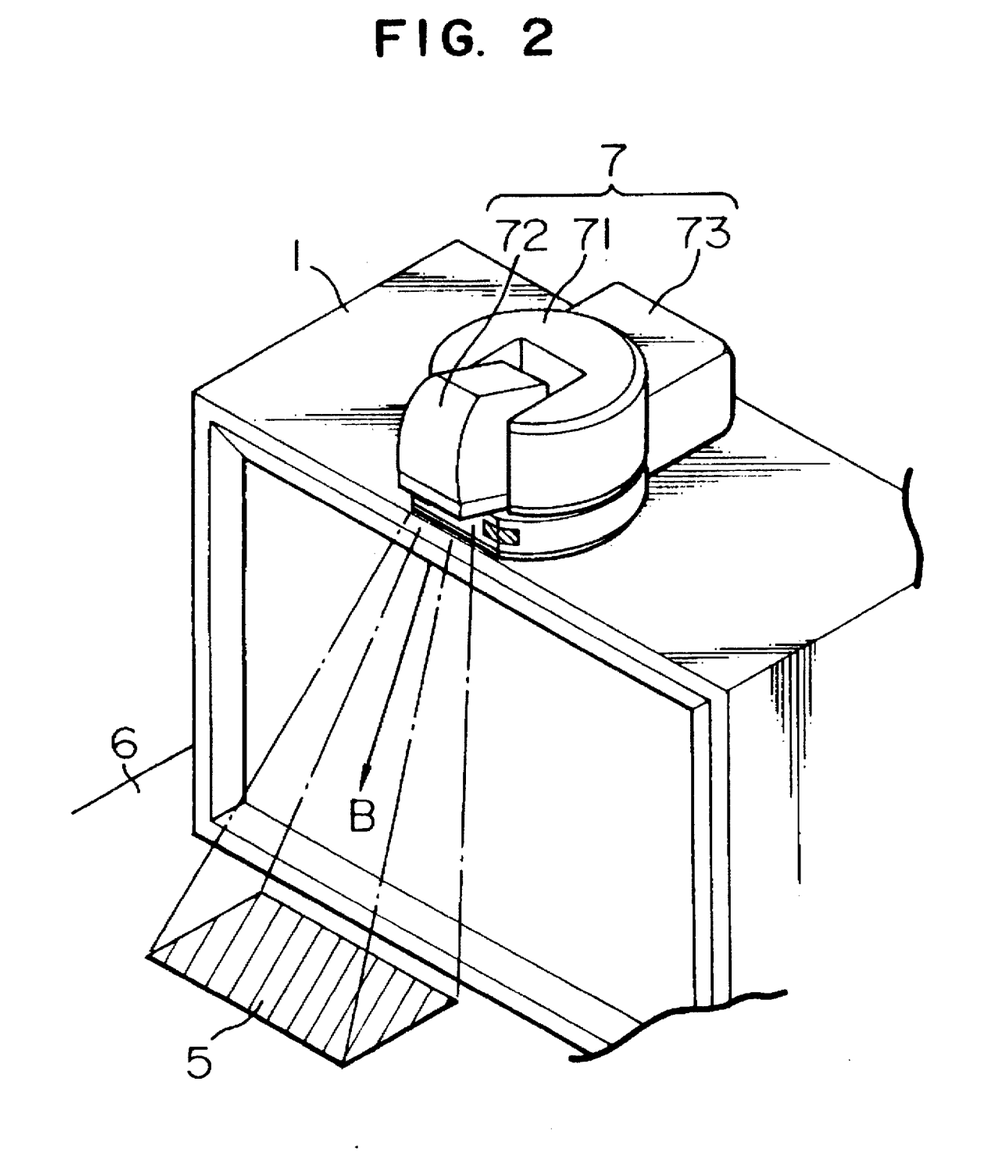
FIG. 2 is a perspective view illustrating the camera unit shown in FIG. 1 in which a lens block is directed substantially right below.

Meanwhile, FIG. 2 shows a document pick-up mode in which the lens block in the camera unit 7 for an electronic conference in this embodiment is directed substantially right below (in the direction of the arrow B) so that the camera unit 7 picks up the document subject 5, that is, the lens block 72 is turned in the tilt direction, relative to the camera unit body 71.

Figure 3A:
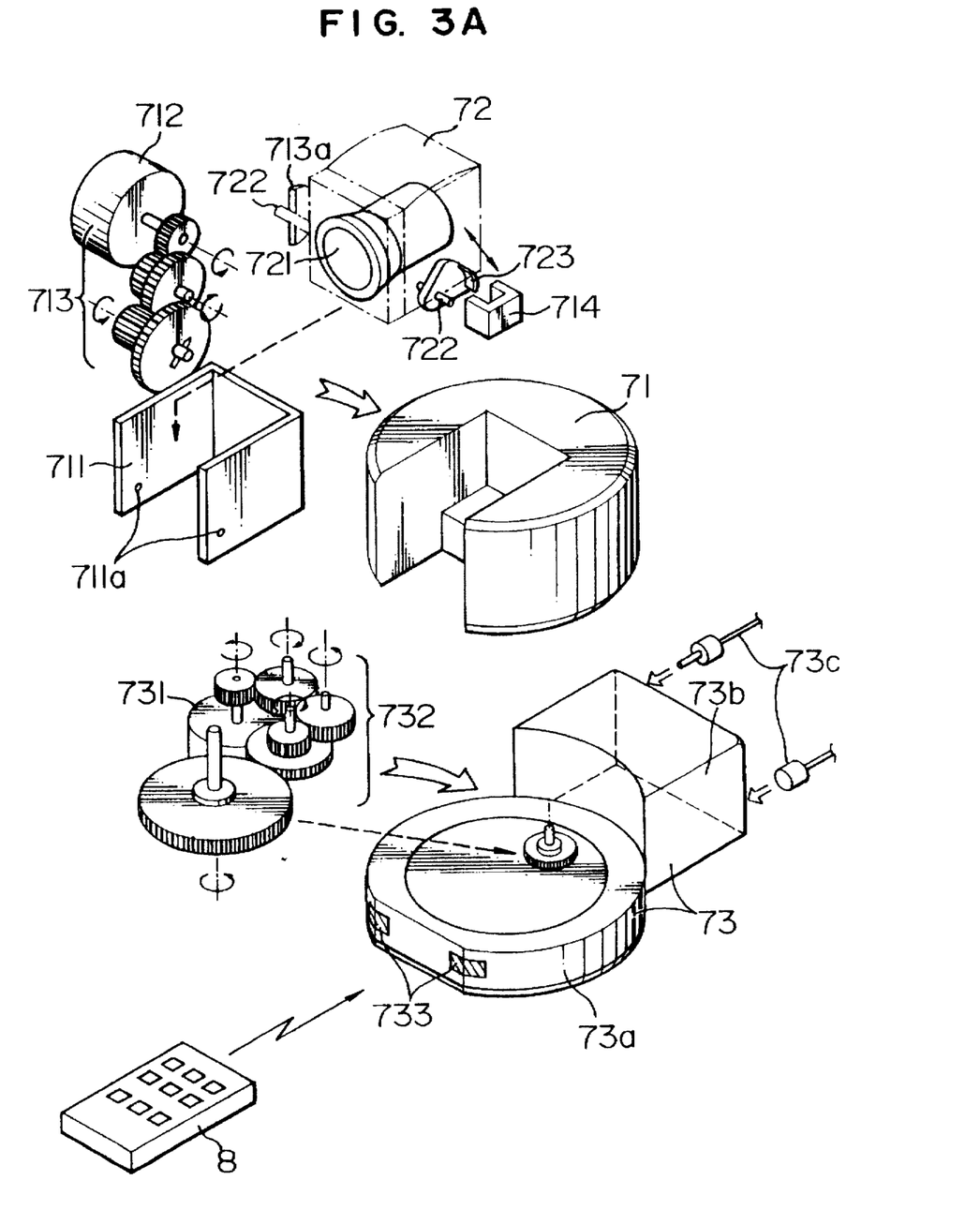
FIG. 3a is an exploded perspective view illustrating the arrangement of the mechanism of the camera unit shown in FIG. 1.

Referring to FIG. 3a, a rectangular parallelepiped recessed space is formed in the camera unit body 71, extending from the center to the front of the latter. A U-like lens block holding member 711 for supporting the lens block 72 so as to be rotatable in the tilt direction is incorporated in the recessed space. Further, a tilt motor 712 and a tilt drive transmission gear part 713 for tilting the lens block 72 are provided outside of the lens block holding member 711.

Figure 3B:
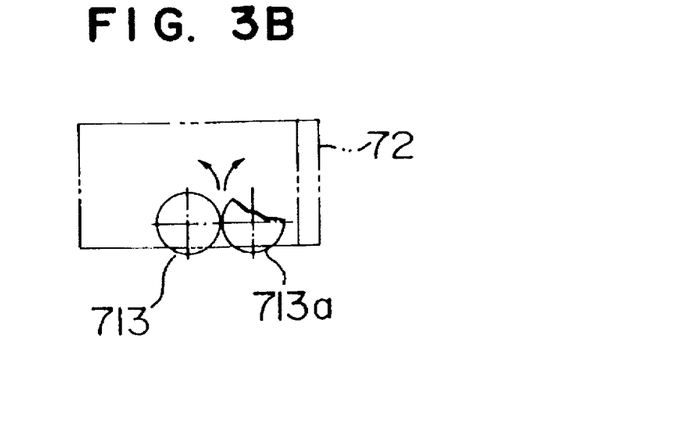

Tilt rotary shafts 722 are attached to the frontmost and lowest parts of left and right side surfaces of the lens block 72 incorporating the lens mechanism 721. One of the tilt rotary shafts 722 is integrally incorporated at its one end with a rotary rib 723 formed therein with slits 723a. This lens block 72 is rotatably journalled to bearing parts 711a of the lens block holding member 711 through the intermediary of the tilt rotary shafts 722. That is, a semi-circular gear 713a secured to the other one of the tilt rotary shafts 722 is meshed with a final drive gear in the tilt drive transmission gear part 713, and is therefore turned by an optional angle from a substantially vertical position to a horizontal position where the lens block 72 is directed slightly upward (refer to FIG. 3b).

Figure 3C:
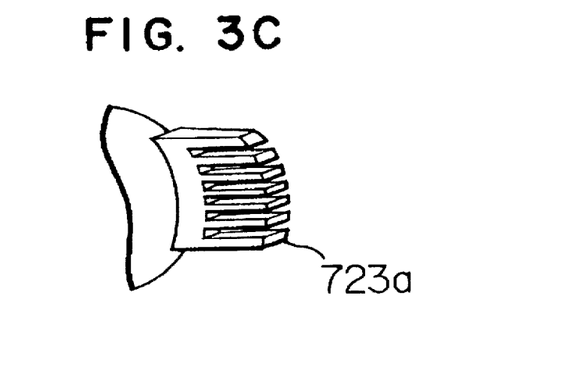

Further, a tilt sensor 714 for detecting a degree of turning of the rotary rib 723 is located at a position opposed to the rotary rib 723. That is, a tilt angle is measured by the tilt sensor 714 which counts a number of the slits 723a (refer to FIG. 3c). During tilt operation of the lens block 72 arranged as mentioned above, the lens block 72 is stored in the recessed space in the camera unit body 71 when the lens block is turned to the horizontal position, but it is projected from the front part of the camera unit body 71 when it is turned to the vertical position.

Figure 3D:
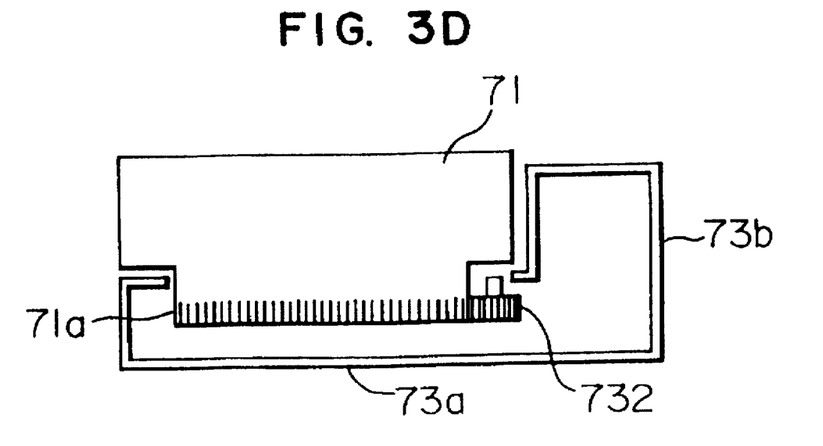

The stationary support base 73 is composed of a bottom part 73a and a rear part 73b, and incorporates a pan motor 731 and a pan drive transmission gear part 732 for horizontally rotating the camera unit body 71. Further, a final drive gear in the pan drive transmission gear part 732 is meshed with a gear 71a (refer to FIG. 3d) formed at the bottom surface of the camera unit body 71, and accordingly, the camera unit body 71 is horizontally turned when the pan motor 731 is driven. Further, a plurality of light receiving parts 733 for receiving a remote control signal from a remote control unit 8 are attached to the front surface of the bottom part 73a of the stationary support base 73.

The bottom part 73a is provided at its bottom surface with rubber boots or fixing screws for fixing the stationary support base 73 to the monitor 1 or a universal head (which is not shown).

Further, the rear part 73b is provided at its rear surface with connectors 73c through which all signal cables and the like from external units are connected to the rear surface of the rear part 73b of the stationary support base 73.

Figure 4A:
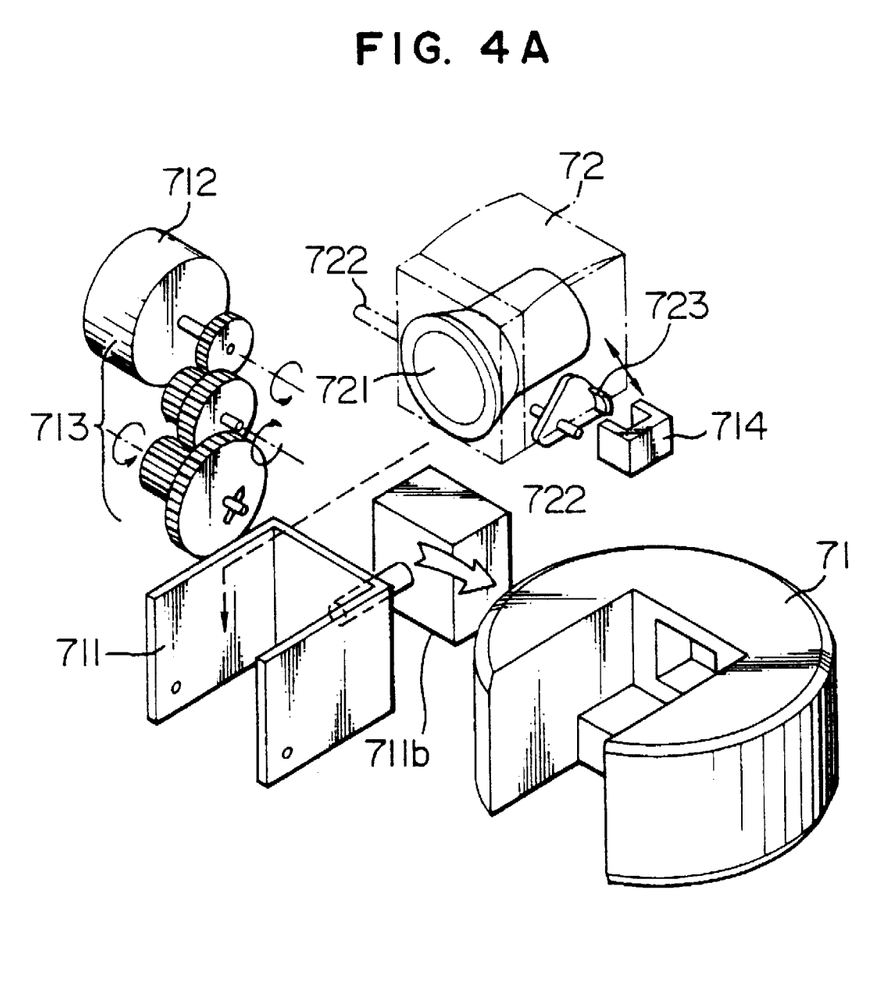

Referring to FIG. 4a illustrating a lens block holding member 711 which is variant from that shown in FIG. 3a, the lens block holding member 711 is arranged so as to be moved forward by means of a solenoid 711b fixed to the camera unit body 71.

With this arrangement, when the solenoid 711b is energized, the lens block holding member 711 is moved forward in its entirety, and thereafter, the tilt motor 712 is controlled so as to turn the lens block 72 to the vertical position. Accordingly, since the lens block 72 can be further projected forward, a wider document pickup range can be ensured.

Figure 4B:
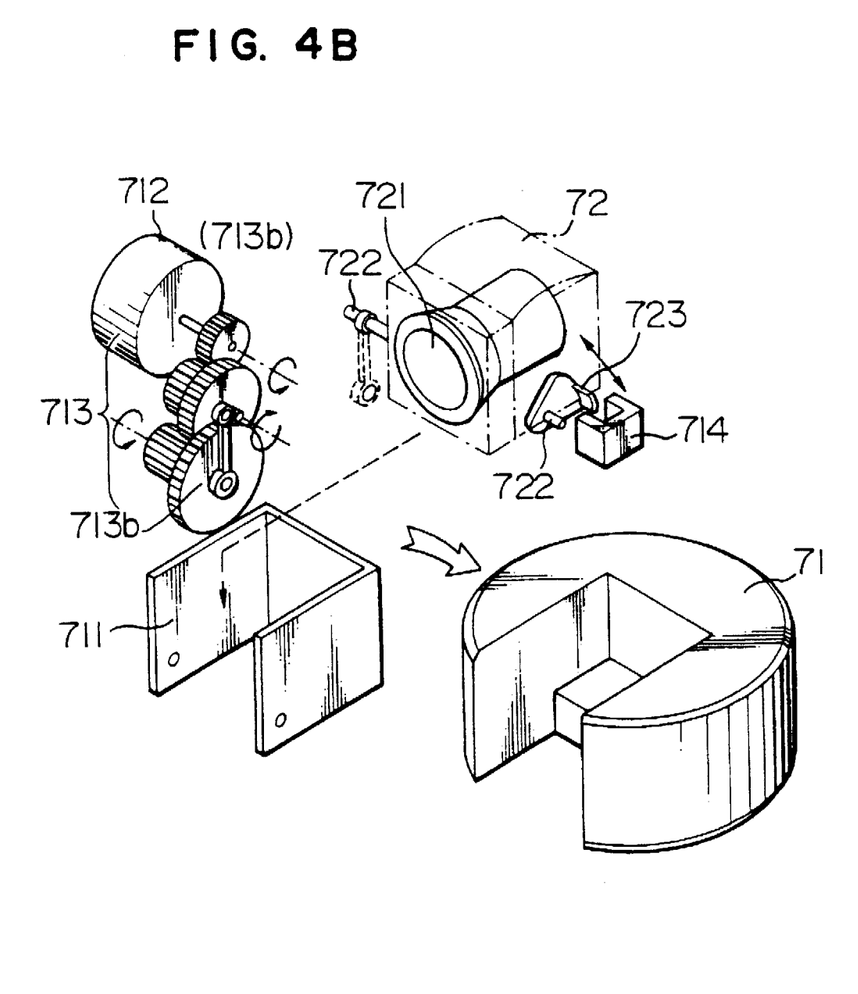
Figure 4C:
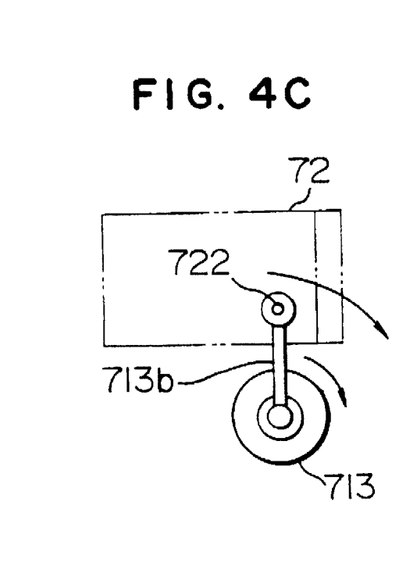
FIG. 4c is a an enlarged view illustrating a part shown in FIG. 4b.

Referring to FIG. 4b illustrating a lens block 72 which is further variant from that shown in FIG. 3a, the lens block 72 is held by the lens block holding member 711. Further, the tilt rotary shafts 722 are coupled to the tilt arm 713b (refer to FIG. 4c).

With this arrangement, when the tilt motor 712 is controlled so as to turn the lens block 72 to the vertical position, the lens block 72 is projected forward by a distance corresponding to the length of the tilt arm 713b. Accordingly, a wider document pick-up range can be ensured.

Figure 5:
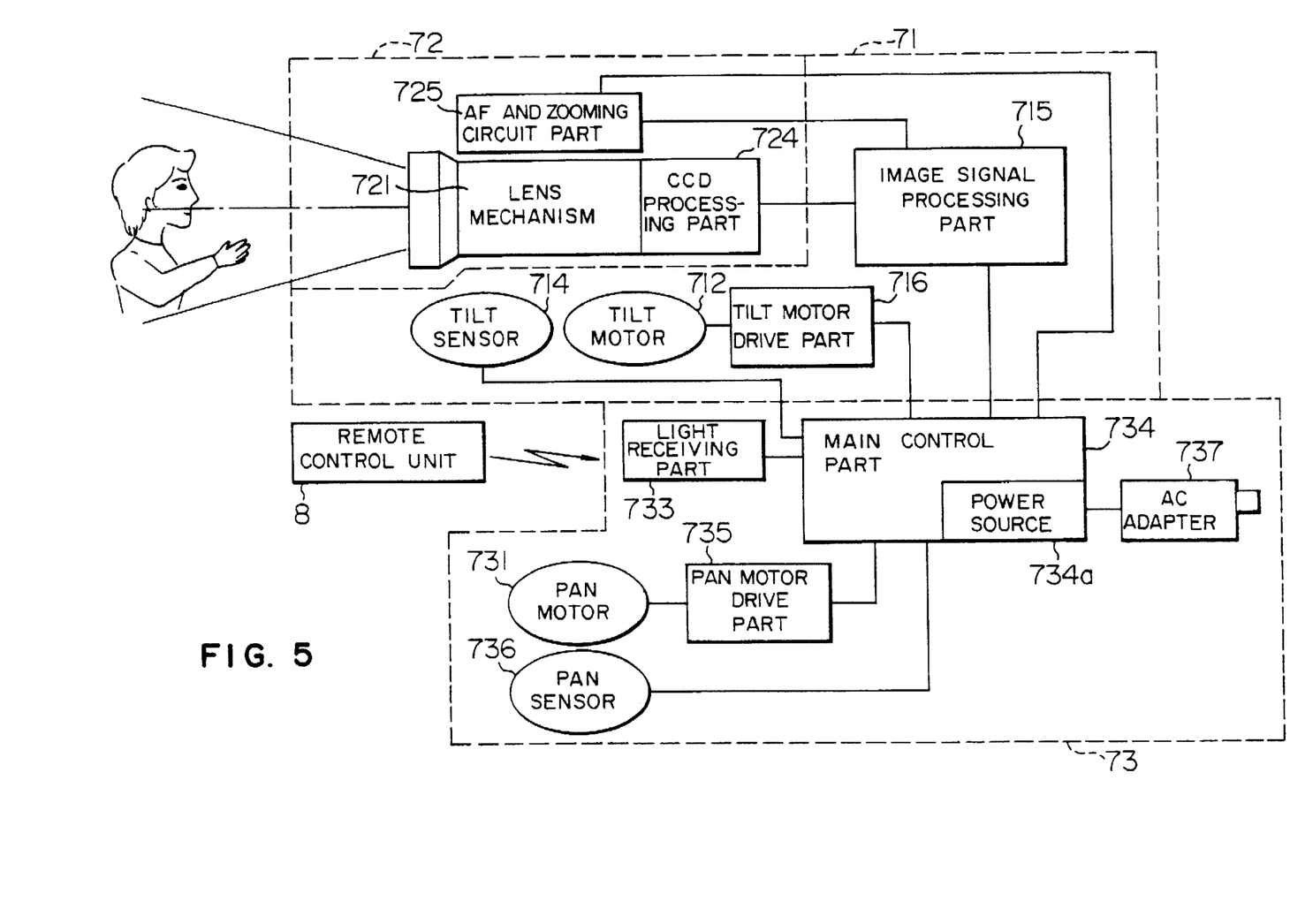
FIG. 5 is a block diagram showing an electronic operating system for the camera unit shown in FIG. 1.

Referring to FIG. 5 which is a block diagram illustrating an electrical operating system in the camera unit for an electronic conference in the above-mentioned embodiment of the present invention, the lens block 72 incorporates the lens mechanism 721, a CCD (image pick-up element) processing part 724 for converting a picked-up image into an electric signal, and an AF and zooming circuit part 725 for controlling automatic focusing (AF) and the viewing angle (zooming) by driving the lens mechanism.

The camera unit body 71 incorporates an image signal processing part 715 for processing a CCD output signal, a tilt motor 712, a tilt sensor 714 and a tilt motor drive part 716. It is noted that the storage position of the image signal processing part 715 should not be limited to that explained in this embodiment, but may be in any component other then the camera unit body 711. However, it is preferable to incorporate the image signal processing part 715 in the lens block 72 located near to a signal source if the processing circuit can be miniaturized.

Further, the stationary support base 73 incorporates the pan motor 731, the light receiving parts 733, a main control part 734, a pan motor drive part 735 and a pan sensor 736.

Next explanation will be hereinbelow made of the operation of the camera unit for an electronic conference in the embodiment of the present invention, arranged as mentioned above.

The image of the personal subject 4 is extracted in the form of an image signal through the lens mechanism 721 and the CCD processing part 724. The image signal is delivered to the monitor 1 shown in FIG. 1, through the image signal processing part 715.

The main control part 734 includes a power source 734a connected to an AC adapter 737, and synthesizes the image signal process and the drive of the motors, and the operation of the lens mechanism.

The AF function and the zooming function are controlled by the AF and zooming circuit part 725 and the main control part 734 (both functions are well-known, and accordingly, the detailed explanation therefor will be omitted in this explanation). The tile operation is controlled by the tilt motor 712, the tilt motor drive pat 716, the tilt sensor 714 and the main control part 734. The pan operation is controlled by the pan motor 731, the pan motor drive part 735, the pan sensor 736 and the main control part 734.

A remote control signal from the remote control unit 8 is received by the receiving parts 733, and is then delivered to the main control part 734. In response to the remote control signal, the main control part 734 transmits control signals to the several components shown in FIG. 5 so as to control the image signal, the AF and zooming functions, the pan operation and the tilt operation.

Thus, since the remote control signal is transmitted to the main control part 734 with the use of the remote control unit 8, the pan operation of the camera unit body 71, the tilt operation of the lens block 72 and the AF and zooming functions of the lens mechanism 721 can be controlled in accordance with control signals from the main control part 734.

The main control part 734 stores, in memory, zooming ratios suitable for the lens mechanism 721 in accordance with pan and tilt movements. These zooming ratios have been previously set in accordance with distances to the subject from the lens mechanism 721 after the pan operation or the tilt operation, and the size of the document subject 5. Accordingly, the main control part 734 can automatically set a focal length and a zooming ratio in accordance with a pick-up direction of the lens mechanism 721. This function is called as "a preset function".

Figure 6:
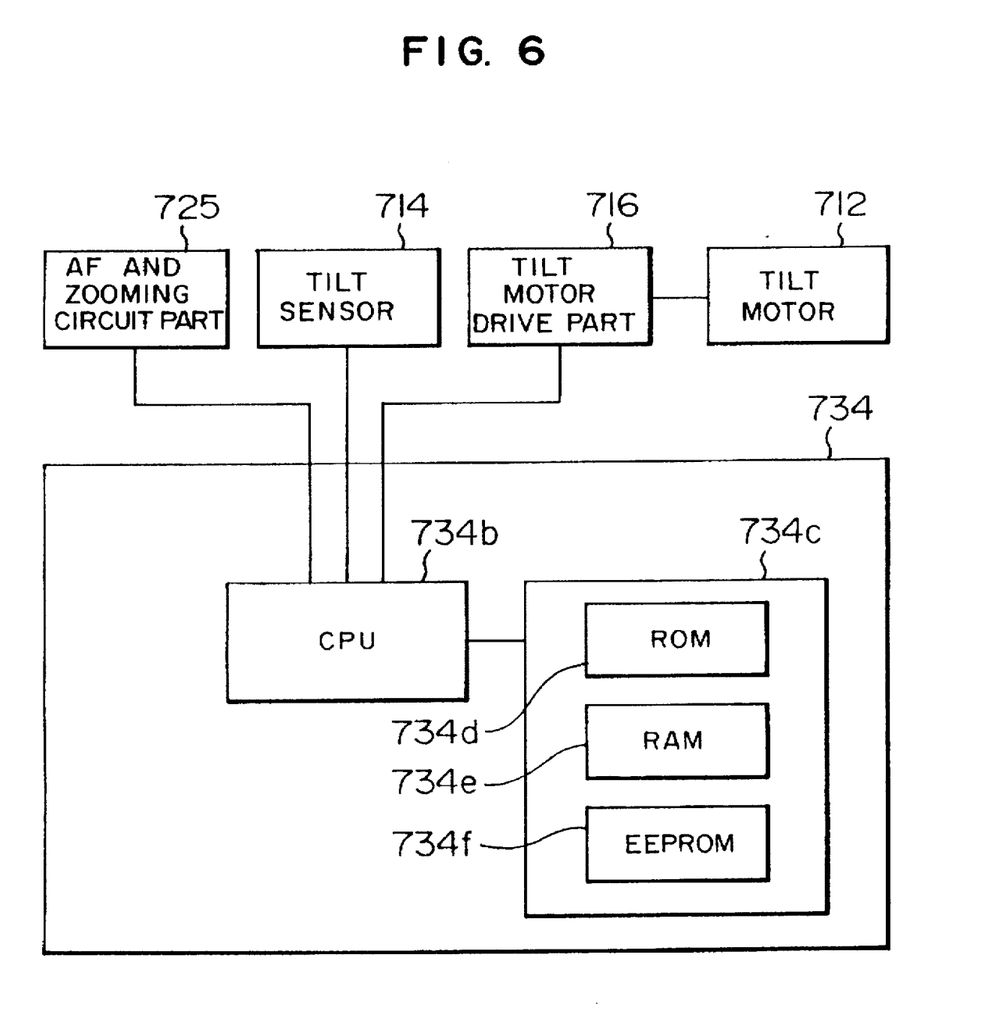
FIG. 6 is a view for explaining a preset function.

Detailed explanation will be hereinbelow made of the preset function with reference to FIG. 6 which is a view for explaining the preset function of the arrangement shown in FIG. 5. The main control part 734 comprises a CPU (central processing unit) 734b and a memory part 734c. Further, the memory part 734c is composed of a ROM 734d storing therein invariant data such as a control program and the like, a RAM 734e for temporarily storing therein data such as computing data which are optionally changed, and an EEPROM 734f for storing therein data such as set data which are changed as necessary.

In this embodiment, the ROM 734d stores therein control programs for controlling the direction of the camera unit for an electronic conference, the tilt operation, and the AF and zooming operation. Further, the EEPROM 734f stores therein set data for setting the lens mechanism 721 at a focal distance and a zooming ratio which are most suitable for picking up the document subject 5 when the lens block 72 takes its document pick-up position.

It is noted that the camera unit may be controlled in dependence upon the automatic focusing function of the AF and zooming circuit part 725. In this case, it is possible to omit such a control that the main control part 734 designates a focal distance. However, in this case, a time for trially focusing the lens block 72 is required.

Figure 7:
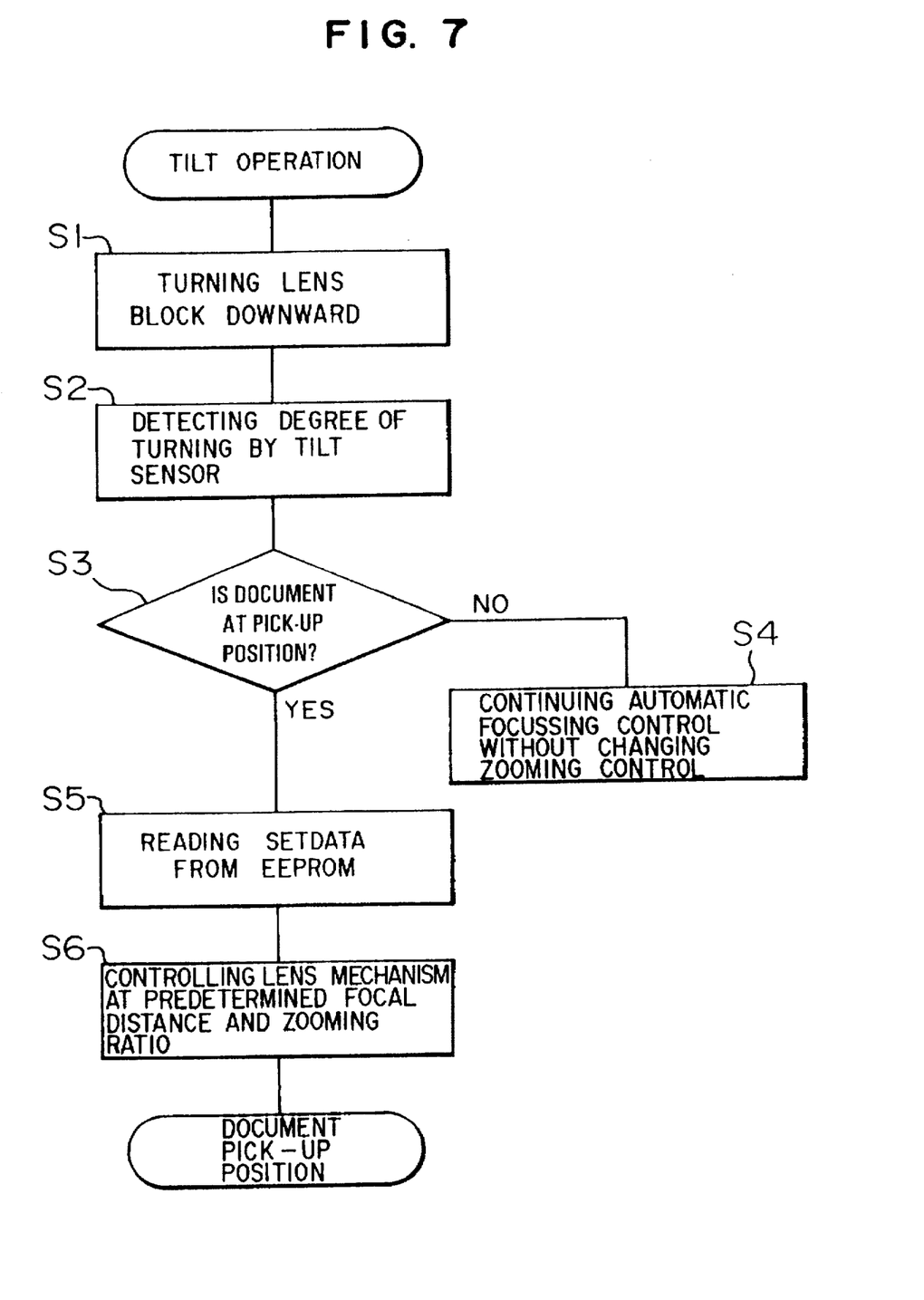
FIG. 7 is a flow chart for explaining a tilt operation of the camera unit shown in FIG. 1.

Next, referring to FIG. 7 which is a flow-chart for the tilt operation in this embodiment, the tilt operation will be hereinbelow explained.

As shown in FIG. 1, the lens block 72 in the camera unit for an electronic conference is set in a front forward direction (the direction of the arrow A) in order to pick up the personal subject 4.

From this condition, with the use of the remote control unit 8, the lens block 72 is turned down to an angle of substantially 90 deg. (S1) in order to pick up the document subject 5 just before the monitor 1, as shown in FIG. 2. The degree of turning is detected by counting a number of slits 723a of the rotary rib 723 shown in FIG. 3c by means of the tilt sensor 714, and a detection signal corresponding to the thus detected degree of turning is transmitted to the main control part 734 shown in FIG. 5 (S2).

The main control part 734 determines whether the lens unit is positioned at the document pick-up position or not, in accordance with the detection signal (S3). If the degree of turning is relatively less than an angle of 90 deg., it is determined that the lens block 72 falls in the person pick-up range, and accordingly, the automatic focusing control operation is continued without changing the zooming control (S4).

If the degree of turning comes to an angle of substantially 90 deg., it is determined that the lens block 72 is at the document pick-up position (S3). Then, the CPU 734b reads set data relating to a focal distance and a zoom ratio which have been stored in the EEPROM 734f (S5), and delivers an instruction signal in accordance with the set data, to the AF and zooming circuit part 725 which therefore controls the lens mechanism 721 to a predetermined focal distance and zooming ratio (6). Thus, the document 5 set in front of the monitor 1 is picked up with the focal distance and the zooming ratio (viewing angle) which have been previously set (which fall in a condition in which the distance, and the viewing angle of the lens mechanism 721 are fixed).

The tilt angle of the lens block 72 need not always be set to a downward angle of 90 deg. during the pick-up of the document subject 5. The document subject 5 set on the monitor setting table 6 can be picked up in accordance with the optical characteristic of the lens mechanism 721.

Thus, as detailed above, the camera unit for an electronic conference in this embodiment is composed of three components, that is, the lens block 72, the camera unit body 71 and the stationary support base 73. Accordingly, not only the rotation of the camera unit body 71 in a horizontal plane but also the vertical motion of the lens block 72 can be smoothly carried out with no mechanical limitation. Moreover, since the tilt rotary shafts 722 are attached to the lens block 72 at the frontmost and lowest position of the latter, the lens block 72 can be projected from the front part of the camera unit body when it is turned to the document pick-up position (directed vertically downward). Accordingly, the lens mechanism 721 can pick-up the document subject 5 set in front of the monitor 1 without its field of view being hindered by an obstacle.

Further, the lens block 72 is stored in the recessed space in the camera unit body 71 when it is turned to the person pick-up position (directed horizontally), and accordingly, the camera unit can have a compact external shape.

Further, with a simple manipulation such that the lens mechanism 721 is turned downward, being directed at an angle of substantially 90 deg with the use of the remote control unit 8, the document subject 5 which has been set on the monitor setting table 6 in front of the monitor 1, can be picked up at a suitable focal distance and zooming ratio (viewing angle) which have been previously set, and accordingly, the camera unit for an electronic conference can be used, being changed over between the person pick-up mode and the document pick-up mode.

Further, the direction of the lens mechanism 721 can be changed over so as to pick up not only the document subject 5 but also plural persons or other subjects by manipulating the remote control unit 8.

Further, the signal cables or the like connected to external units are all connected to the rear surface of the rear part 73b of the stationary support base 73, and accordingly, they are never moved during the pan operation or the tilt operation. Further, since the signal cables and the like never come to a position in front of the monitor 1 and the lens mechanism 721, there is no risk of hindering the field of view.

What is claimed is:

1. A camera unit for being set on a box-like housing which is carried on a table-like base and for use in a communication system for transmitting data including picked-up image data, said camera unit comprising:

a first body having a pivot axis positioned near a front and bottom portion of said first body, said first body incorporating a lens means having an optical axis oriented transverse to and spaced a distance from said pivot axis, for picking up an image of a subject set on said table-like base;

a second body having first support means for supporting said first body so as to allow said first body to rotate relative to said second body in a vertical plane and first drive means for rotating said first body about said pivot axis; and a third body having second support means for supporting said second body so as to allow said second body to rotate in a horizontal plane and second drive means for rotating said second body in said horizontal plane, said third body having a structure for being directly set on said box-like housing which is carried on said table-like base, wherein:

said first support means has a rotatable range in which said first body can be rotated from a first position in which said lens means has said optical axis oriented in a substantially horizontal direction to a second position in which said lens means has said optical axis oriented in a substantially vertical direction, and said first body is projected into a space in front of said second body when said first body is rotated to said second position, said distance being set such that said lens means is located at a position where said lens means has a pick-up range substantially excluding said second body, said third body and said box-like housing when said lens means is oriented in a substantially vertical direction when said first body is located at said second position.

2. A camera unit for an electronic conference as set forth in claim 1, wherein said first body has rotary shafts at its left and right side surfaces at said pivot axis, said first drive means has a drive gear, and said rotary shafts are journalled to said first support means while said drive gear in said first drive means is engaged with a gear fixed to at least one of said rotary shafts.

3. A camera unit for an electronic conference asset forth in claim 1, wherein said first body has rotary shafts at its left and right side surfaces at said pivot axis, said first drive means has a drive gear, said rotary shafts are journalled to said first support means while said drive gear in said first drive means is engaged with a gear fixed to one of said rotary shafts, and said first support means is disposed in said second body through the intermediary of means for longitudinally moving said first support means relative to said second body.

4. A camera unit for an electronic conference as set forth in claim 1, wherein said first body has rotary shafts at its left and right side surfaces at said pivot axis, and said first drive means has a drive arm which is journalled at one end to said first support means and is fixed another end to one of said rotary shafts.

5. A camera unit for an electronic conference as set forth claim 1, wherein a connector for being connected to an external unit is provided at the rear surface of the rear part of said third body.

6. A camera unit for being set on a box-like housing which is carried on a table-like base and for use in a communication system for transmitting data including picked-up image data, said camera unit comprising:
    a first body having a pivot axis positioned near a front and bottom portion of said first body, said first body incorporating a lens means having an optical axis oriented transverse to and spaced a distance from said pivot axis, for picking up an image of a subject set on said table-like base;
    a second body having a recessed space for disposing therein said first body, first support means for supporting said first body so as to allow said first body to rotate relative to said second body in a vertical plane, first drive means for rotating said first body about said pivot axis, and image signal processing means for processing an image signal obtained from said lens means;
    a third body having second support means for supporting said second body so as to allow said second body to rotate in a horizontal plane and second drive means for rotating said second body in said horizontal plane, said second support means having a structure for being directly being set on said box-like housing which is carried on said table-like base; and
    control means for controlling said image signal processing means, said first drive means and said second drive means, wherein:
        said first support means has a rotatable range in which said first body can be rotated from a first position in which said lens means has said optical axis oriented in a substantially horizontal direction to a second position in which said lens means has said optical axis oriented in a substantially vertical direction, and said first body is disposed in said recessed space when said first body is in said first position, and said first body is projected into a space in front of said second body when said first body is in said second position, said distance being set such that said lens means is located at a position where said lens means has a pick-up range substantially excluding said second body, said third body, said box-like housing when said lens means is oriented in a substantially vertical direction at said second position.

7. A camera unit for an electronic conference as set forth in claim 6, wherein said first body has rotary shafts at its left and right side surfaces at said pivot axis, said first drive means has a drive gear, and said rotary shafts are journalled to said first support means while said drive gear in said first drive means is engaged with a gear fixed to at least one of said rotary shafts.

8. A camera unit for an electronic conference as set forth in claim 6, wherein said first body has rotary shafts at its left and right side surfaces at said pivot axis, said first drive means has a drive gear, said rotary shafts are journalled to said first support means while said drive gear in said first drive means is engaged with a gear fixed to one of said rotary shafts, said first support means is disposed in said second body through the intermediary of means for longitudinally moving said first support means relative to said second body, and said control means carries out a control in which said first support means is moved forward by said means for longitudinally moving before the first body is moved to said second position.

9. A camera unit for an electronic conference as set forth in claim 6, wherein said first body has rotary shafts at its left and right side surfaces at said pivot axis, and said first drive means has a drive arm which is journalled at one end to said first support means and is fixed at another end to one of said rotary shafts.

10. A camera unit for an electronic conference as set forth in claim 6, wherein said control means includes memory means which has previously stored therein set data for setting said lens means at a most suitable focal distance and zooming ratio in order to allow said lens means to pick up a document subject when said first body is moved to said second position, and said control means reads said set data from said memory means so as to control the lens means which is therefore set to a predetermined focal distance and zooming ratio, when said first body is moved to said second position.

11. A camera unit for an electronic conference as set forth in claim 6, wherein said lens means has an automatic focusing function, said control means includes memory means which has previously stored therein set data for setting said lens means at a most suitable zooming ratio in order to allow said lens means to pick up a document subject when said first body is moved to said second position, and said control means reads said set data from said memory means so as to control the lens means which is therefore set to a predetermined zooming ratio when said first body is moved to said second position.

12. A camera unit for an electronic conference as set forth claim 6, wherein a connector for being connected to an external unit is provided at the rear surface of the rear part of said third body.

13. A camera unit being set on a box-like housing which is carried on a table-like base and for use in a communication system for transmitting data including picked-up image data, said camera unit comprising:
    a first body having a pivot axis positioned near a front and bottom portion of said first body, said first body incorporating a lens means having an optical axis oriented transverse to and spaced a distance from said pivot axis, for picking up an image of a subject set on said table-like base, and having rotary shafts at left and right side surfaces at said pivot axis;

a second body having a recessed space for disposing therein said first body, first support means to which said rotary shafts are journalled, for supporting said first body so as to allow said first body to rotate relative to said second body in a vertical plane, first drive means having a drive gear, for rotating said first body about said pivot axis, and image signal processing means for processing an image signal obtained from said lens means, said first body and said first drive means being positioned so that said drive gear in said first drive means is engaged with a gear fixed to one of said rotary shafts;

a third body having second support means for supporting said second body so as to allow said second body to rotate in a horizontal plane and second drive means for rotating said second body in said horizontal plane, and having a rear part with a rear surface to which a connector for being connected to an external unit is provided, said third body having a structure for being directly being set on said box-like housing which is carried on said table-like base; and control means including memory means, for controlling said image signal processing means, said first drive means and said second drive means, wherein:

said first support means has a rotatable range in which said first body is rotatable from a first position in which said lens means has an optical axis oriented in a substantially horizontal direction to a second position in which said lens means has said optical axis oriented in a substantially vertical direction, said first body being disposed in said recessed space when said first body is moved to said first position and the first body being projected into a space in front of said second body when said first body is moved to said second position, said distance being set such that said lens means is located at a position where said lens means has a pick-up range substantially excluding said second body, said third body and said box-like housing when said lens means is oriented in a substantially vertical direction at said second position, and said memory means has previously stored therein set data for setting said lens means at a most suitable focal distance and zooming ratio in order to allow said lens means to pick up a document subject set on said table-like base when said first body is moved to said second position, said control means reading set data from said memory means so as to control the lens means which is therefore set at a predetermined focal distance and zooming ratio when said first body is moved to said second position.

14. A camera unit being set on a box-like housing which is carried on a table-like base and for use in a communication system for transmitting data including picked-up image data, said camera unit comprising:

a first body having a pivot axis positioned near a front and bottom portion of said first body, said first body incorporating lens means having an optical axis oriented transverse to and spaced a distance from said pivot axis, having an automatic focusing function, for picking up an image of a subject set on said table-like base, and having rotary shafts at left and right side surfaces at said pivot axis;

a second body having a recessed space for disposing therein said first body, first support means to which said rotary shafts are journalled, for supporting said first body so as to allow said first body to rotate relative to said second body in a vertical plane, first drive means having a drive gear, for rotating said first body about said pivot axis, and image signal processing means for processing an image signal obtained from said lens means, said first body and said first drive means being positioned so that said drive gear in said first drive means is engaged with a gear fixed to one of said rotary shafts;

a third body having second support means for supporting said second body so as to allow said second body to rotate in a horizontal plane and second drive means for rotating said second body in said horizontal plane, and having a rear part with a rear surface to which a connector for being connected to an external unit is provided, said third body having a structure for being directly being set on said box-like housing which is carried on said table-like base; and control means including memory means, for controlling said image signal processing means, said first drive means and said second drive means, wherein:

said first support means has a rotatable range in which said first body is rotatable from a first position in which said lens means has said optical axis oriented in a substantially horizontal direction to a second position in which said lens means has said optical axis oriented in a substantially vertical direction, said first body being disposed in said recessed space when said first body is moved to said first position and the first body being projected into a space in front of said second body when said first body is moved to said second position, said distance being set such that said lens means is located at a position where said lens means has a pick-up range substantially excluding said second body, said third body and said box-like housing when said lens means is oriented in a substantially vertical direction at said second position, said memory means has previously stored therein set data for setting said lens means at a most suitable zooming ratio in order to allow said lens means to pick up an image of a document subject set on said table-like base when said first body is moved to said second position, and said control means reads said set data from said memory means so as to control the lens means which is therefore set at a predetermined zooming ratio when said first body is moved to said second position.

* * * * *